March 12, 1957 R. C. JAYE 2,784,510
LETTER FOR DISPLAY SIGNS
Filed Dec. 15, 1952 3 Sheets-Sheet 1
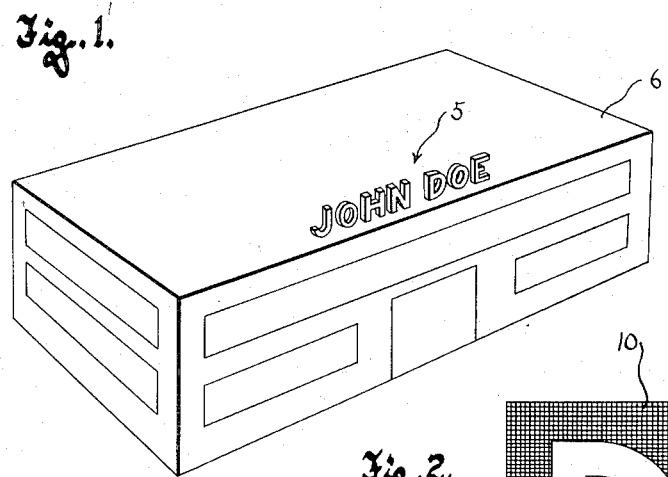
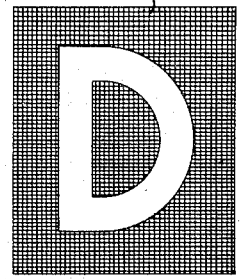
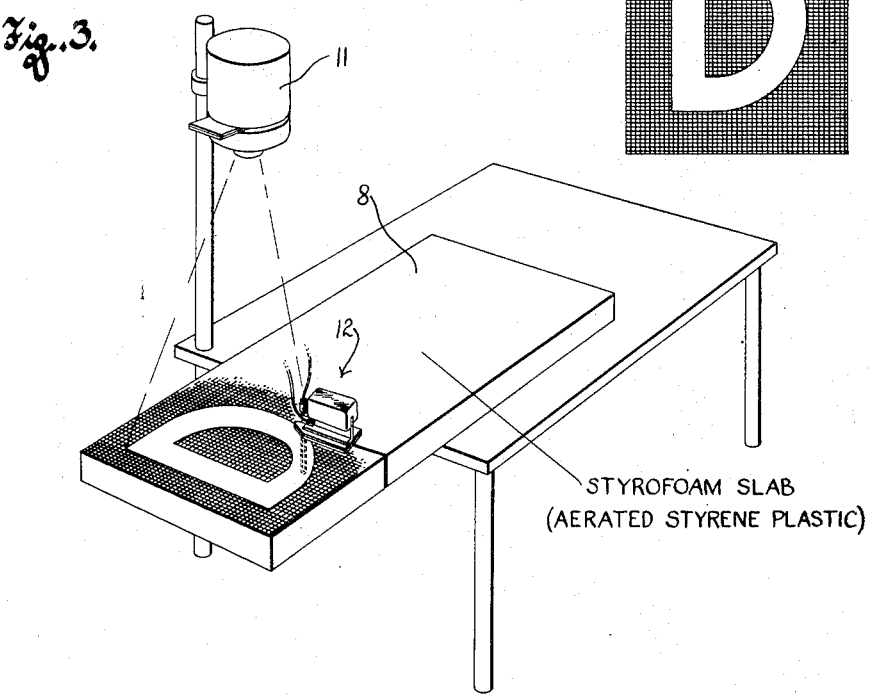
STYROFOAM SLAB
(AERATED STYRENE PLASTIC)

March 12, 1957  R. C. JAYE  2,784,510
LETTER FOR DISPLAY SIGNS
Filed Dec. 15, 1952  3 Sheets-Sheet 2
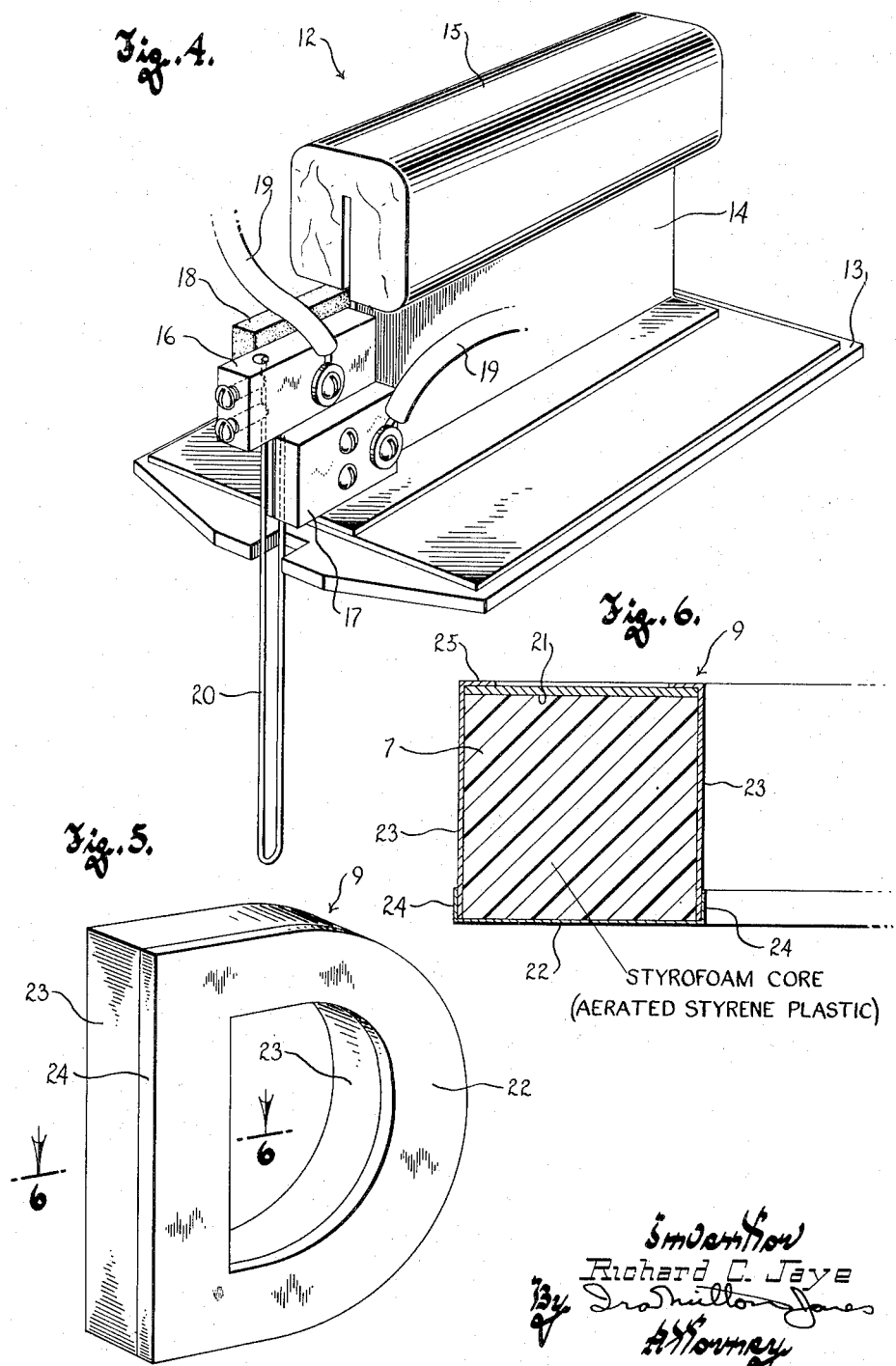

March 12, 1957 R. C. JAYE 2,784,510
LETTER FOR DISPLAY SIGNS
Filed Dec. 15, 1952 3 Sheets-Sheet 3

STYROFOAM CORE
(AERATED STYRENE PLASTIC)

Richard C. Jaye
By
Attorney

United States Patent Office 2,784,510
Patented Mar. 12, 1957

2,784,510

LETTER FOR DISPLAY SIGNS

Richard C. Jaye, Watertown, Wis., assignor to The Jaye Corporation, Watertown, Wis., a corporation of Wisconsin Application December 15, 1952, Serial No. 326,053

1 Claim. (Cl. 40—135)

This invention relates to display signs and more particularly to signs of the type adapted for outdoor use such as those often mounted on the front or upon the roof of buildings.

Heretofore large outdoor signs or displays of the type referred to were generally made up of hollow metal letters, each of which cost a considerable amount to produce. The usual practice was to make a full scale pattern or templet of each letter and then with the use of this pattern or templet cut front and back faces for the letter from suitable sheet metal, generally brass or the like. These front and back faces were joined together by a side wall-forming strip welded or brazed thereto. The welding or brazing inevitably resulted in a rough uneven edge which had to be ground off. All in all, the production of such hollow letters suitable for outdoor advertising displays was a costly undertaking and in addition required highly skilled help.

The chief purpose of this invention is to provide a display sign suitable for such outdoor service, which is considerably cheaper to produce than the hollow metal letters heretofore used, and which can be made by unskilled help.

Broadly stated, the invention consists in the provision of a display sign which consists of a core of "Styrofoam" (aerated styrene plastic) having its surfaces suitably protected by the application thereof of metal foil; and in the manner in which the core for the display sign is cut from a slab of Styrofoam using a projected image of a replica of the sign or a unit thereof which has been delineated upon a slide or its equivalent at a conveniently small scale.

With the above and other objects in view, which will appear as the description proceeds, this invention resides in the novel features substantially as hereinafter described and more particularly defined by the appended claim, it being understood that such changes in the precise embodiment of the hereindisclosed invention may be made as come within the scope of the claim.

The accompanying drawings illustrate one complete example of the physical embodiment of the invention constructed according to the best mode so far devised for the practical application of the principles thereof, and in which:

Figure 1 is a perspective view, diagrammatically illustrating a building equipped with a roof sign of the type with which this invention is concerned;

Figure 2 is a plan view of a slide or transparency having a replica of one unit or section of the display sign delineated thereon, and which slide is used in the making of the actual letter;

Figure 3 is a perspective view of the apparatus employed in projecting an image of the slide onto a slab of aerated plastic, and for cutting the slab along the outline of the projected image to form the core for the display sign or unit thereof;

Figure 4 is a perspective view of the tool used to cut the plastic slab;

Figure 5 is a perspective view of the finished display sign unit;

Figure 6 is a cross sectional view through Figure 5 on the plane of the line 6—6, but at a considerably enlarged scale;

Figure 7:
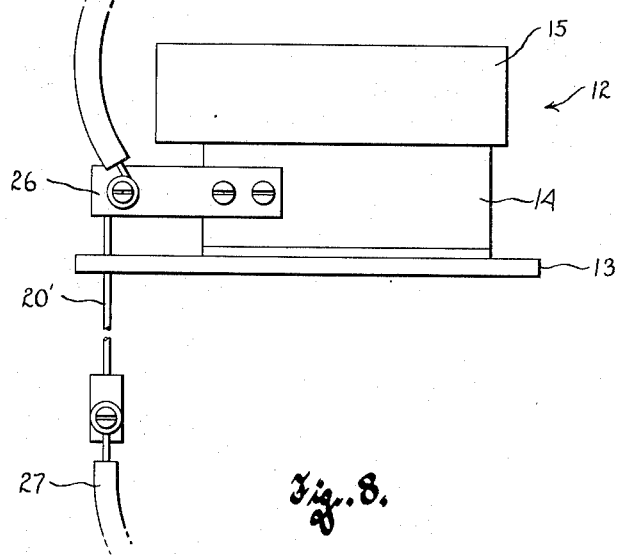
Figure 7 is a side view of a cutting tool of slightly modified construction.

As noted hereinbefore, this invention is primarily concerned with the production of outdoor displays such as a sign 5 mounted upon the roof of a building 6 as shown in Figure 1. The letters of such signs are, of course, quite large, often more than two feet high, and consequently if they are made up of metal in the way heretofore customarily employed the sign is very expensive to produce.

The present invention achieves all of the advantages of such hollow metal signs and letters at a much lower cost, and in addition facilitates its presentation and sale to a prospective customer. To this end each unit of the display consists of a core 7 of Styrofoam (aerated styrene plastic) cut from a slab 8 thereof and covered with a protective shell indicated generally by the numeral 9.

In preparing for the production and sale of such a display, a photograph is first taken of the front of the building or other aspect thereof upon which the sign is to be mounted or erected, and then the proposed sign is drawn in upon a print of the photograph. This affords an attractive presentation of the product and facilitates the sale thereof to prospective customers.

Next an image of the sign or a unit or section thereof is reproduced on a conveniently small scale upon a slide or transparency 10, as shown in Figure 2. This transparency or slide is placed in a projector 11 and the image thereof projected down onto the top of the slab 8, the projected image being at full scale. Obviously, if desired, a translucent paper print of the entire original picture may be used in lieu of the slide or transparency 10. In any event an image of the display or a unit thereof is projected at full scale onto the slab of Styrofoam from which the image is to be cut.

With the image thus projected the slab is cut along the outline of the image by means of a hot wire cutting tool indicated generally by the numeral 12. This tool, as best shown in Figure 4, comprises a base 13 of insulating material upon which is mounted an upstanding centrally located flange 14. The flange 14 is preferably of metal and has a handle 15 of wood or other insulating material secured to the top thereof. Also secured to the flange 14 are two terminals 16 and 17, the latter which is grounded being secured directly to the flange 14 while the former is electrically insulated therefrom by virtue of its being fixed upon an arm 18 of insulating material. These terminals are adapted to have supply leads 19 attached thereto and each has one end of a looped length of resistance wire 20 secured thereto.

The looped resistance wire projects perpendicularly from the undersurface of the base 13 a distance sufficient to pass through the full thickness of the slab 8; and obviously, upon connection of the leads 19 with a source of current the loop 20 becomes hot and readily cuts through the Styrofoam.

After the core for the display unit has been cut from the slab in the manner described, its protective coating or facing 9 is applied. This facing comprises a stiff sheet metal backing 21, a front facing 22 and side facings 23. The backing sheet 21 is formed of any suitable sheet metal as for instance brass or galvanized iron and has sufficient weight to provide mechanical strength for the unit. It is cut from a sheet of metal along the outline traced thereon from the core itself. The front facing 22 is similarly cut from a sheet of metal but of much lighter gauge and preferably from aluminum foil or the like, but in tracing its outline a marginal edge portion 24 is provided. The side facings 23 consist merely of strips of sheet metal long enough to encompass the entire side, either inner or outer, of the display unit and wide enough to span the full width of the core plus an additional amount to provide a lapped-over flange 25.

An important aspect of this covering or facing is that the front facing 22 is of much lighter weight than the side facings 23 and these in turn are of much lighter weight than the backing sheet 21. Consequently, in applying the covering the marginal edge portions 24 of the front facing are readily folded or lapped over the adjacent marginal edge portions of the side facings 23 without danger of collapsing the core, and likewise the rear marginal edge portions of the side facings are readily lapped or folded over the adjacent edges of the rear backing sheet 21 without danger of collapsing the corners of the plastic core.

This difference in the weight of the covering sheets also has the advantage of assuring a close fitting, snug contact between the lapped-over portions and the parts lapped thereby. In each instance the covering sheet is adhered to the adjacent face of the core by suitable adhesive.

Figure 8:
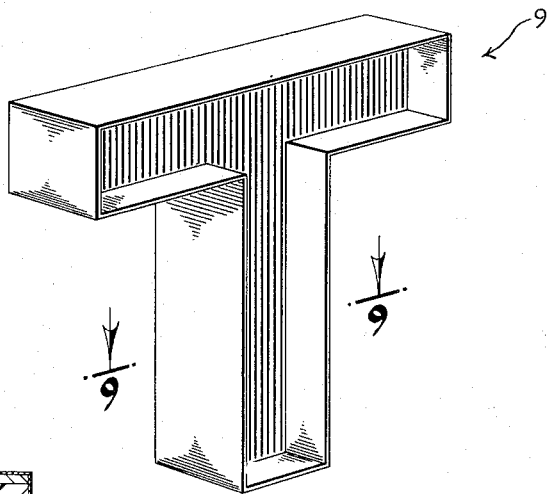
Figure 8 is a perspective view of a display sign unit made in accordance with this invention, but slightly modified in its construction.
Figure 9:
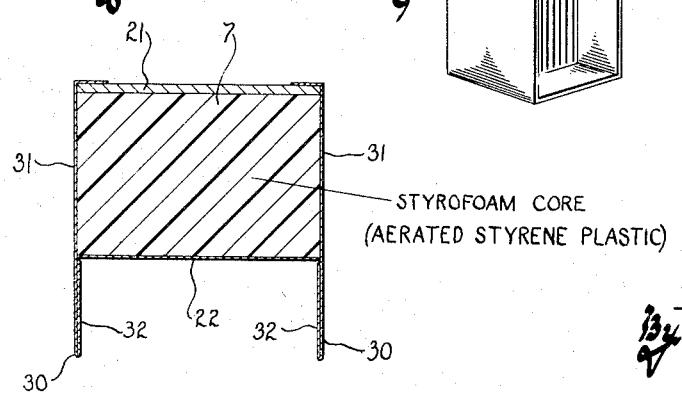
Figure 9 is a cross sectional view through Figure 8 on the plane of the line 9—9.

Though the tool described and shown in Figure 4 is preferred, the somewhat modified embodiment thereof shown in Figure 7 may be employed. This tool differs from the one described in that its resistance wire 20' is not looped but merely one straight length of stiff wire, the upper end of which is fastened to the terminal 26 and the lower end of which has a flexible conductor 27 fixed thereto.

Where the display units are to be lighted by Neon or other lights mounted either in the front or back face, the modified construction shown in Figures 8 and 9 is desirable. This modified construction is characterized by flanges 30 projecting beyond the face to be lighted (either front or back) to give this face a recessed formation for the reception of the lighting element or elements, not shown. These flanges are formed by extending the side facings 31 beyond the face to be lighted, and folding the extended portions back upon themselves as at 32.

From the foregoing description taken in connection with the accompanying drawings, it will be readily apparent to those skilled in the art that this invention provides an extremely simple but effective display sign especially suitable for such outdoor uses as large signs mounted on the front or erected upon the roof of buildings, and that the invention enables the production of such a display sign at a much lower cost than has heretofore been possible.

What I claim as my invention is:

A light weight block character for a large display sign, comprising: a core of aerated plastic material having the outline of the character; a stiff sheet metal backing for the core, covering and adhered to the entire back face thereof; a sheet metal facing covering the sides of the core, said side facing being of considerably lighter gauge than the stiff metal backing and having its marginal edge portion which is adjacent to the stiff backing folded over the edge of the backing, the front edge of the side facing terminating at the plane of the front face of the core; and a metal foil facing covering and adhered to the front face of the core, the marginal edge portions of said foil facing being folded over the adjacent edges of the side facing.

References Cited in the file of this patent

UNITED STATES PATENTS

| | | |
|---|---|---|
| 805,266 | Cunningham | Nov. 21, 1905 |
| 1,906,582 | Gundlach | May 2, 1933 |
| 2,136,180 | Cooke | Nov. 8, 1938 |
| 2,289,084 | Temple | July 7, 1942 |
| 2,299,331 | Marinone | Oct. 20, 1942 |
| 2,366,377 | Zois | Jan. 2, 1945 |
| 2,539,095 | McMath | Jan. 23, 1951 |
| 2,558,309 | Mitten | June 26, 1951 |
| 2,584,523 | Braun | Feb. 5, 1952 |
| 2,595,970 | McGill | May 6, 1952 |
| 2,663,527 | Joslyn | Dec. 22, 1953 |
| 2,716,827 | Mixter | Sept. 6, 1955 |